(12) United States Patent
Gardner (10) Patent No.: US 6,578,598 B2
(45) Date of Patent: Jun. 17, 2003

(54) VALVE HAVING AN INNER WASHING STRUCTURE

(75) Inventor: Murray Gardner, Oakville (CA)

(73) Assignee: J.V.P. Inc., New Providence (BS)

( * ) Notice: Subject to any disclaimer, the term of this patent is extended or adjusted under 35 U.S.C. 154(b) by 0 days.

(21) Appl. No.: 09/970,858

(22) Filed: Oct. 5, 2001

(65) Prior Publication Data

US 2003/0066982 A1 Apr. 10, 2003

(51) Int. Cl.[7] .................................................. F16K 5/06
(52) U.S. Cl. ..................................... 137/240; 251/315.1
(58) Field of Search ................................ 137/240, 241, 137/238; 251/315.01, 315.1

(56) References Cited

U.S. PATENT DOCUMENTS

| | | | | |
|---|---|---|---|---|
| 3,416,558 A | * | 12/1968 | Works | 251/315.14 |
| 3,605,789 A | * | 9/1971 | Graham | 137/240 |
| 3,744,319 A | * | 7/1973 | Harmes, III | 137/240 |
| 3,916,940 A | * | 11/1975 | Allen | 251/315.15 |
| 4,203,460 A | * | 5/1980 | Priese | 137/240 |
| 4,304,252 A | * | 12/1981 | Stanton | 137/240 |
| 4,505,294 A | * | 3/1985 | Walter | 137/241 |
| 4,566,482 A | * | 1/1986 | Stunkard | 137/240 |
| 4,749,002 A | * | 6/1988 | Lembser | 251/315.1 |
| 5,842,683 A | * | 12/1998 | Wei | 137/240 |

* cited by examiner

Primary Examiner—Ehud Gartenberg
Assistant Examiner—John Bastianelli
(74) Attorney, Agent, or Firm—Rosenberg, Klein & Lee (57) ABSTRACT

A valve having an inner washing structure, includes a receiving chamber. The valve is formed with at least one washing hole which is located at a position opposite to the tangential plane of the outer diameter of the ball, and is communicated with the receiving chamber. Thus, the valve can be washed through the washing hole directly, without having to detach the valve, thereby facilitating the washing work without wearing the inside of the valve.

3 Claims, 9 Drawing Sheets

VALVE HAVING AN INNER WASHING STRUCTURE

BACKGROUND OF THE INVENTION

1. Field of the Invention

The present invention relates to a valve having an inner washing structure, and more particularly to a valve having an inner washing structure, wherein the valve can be washed through the washing hole directly, without having to detach the valve, thereby facilitating the washing work without wearing the inside of the valve.

2. Description of the Related Art

Figure 9:
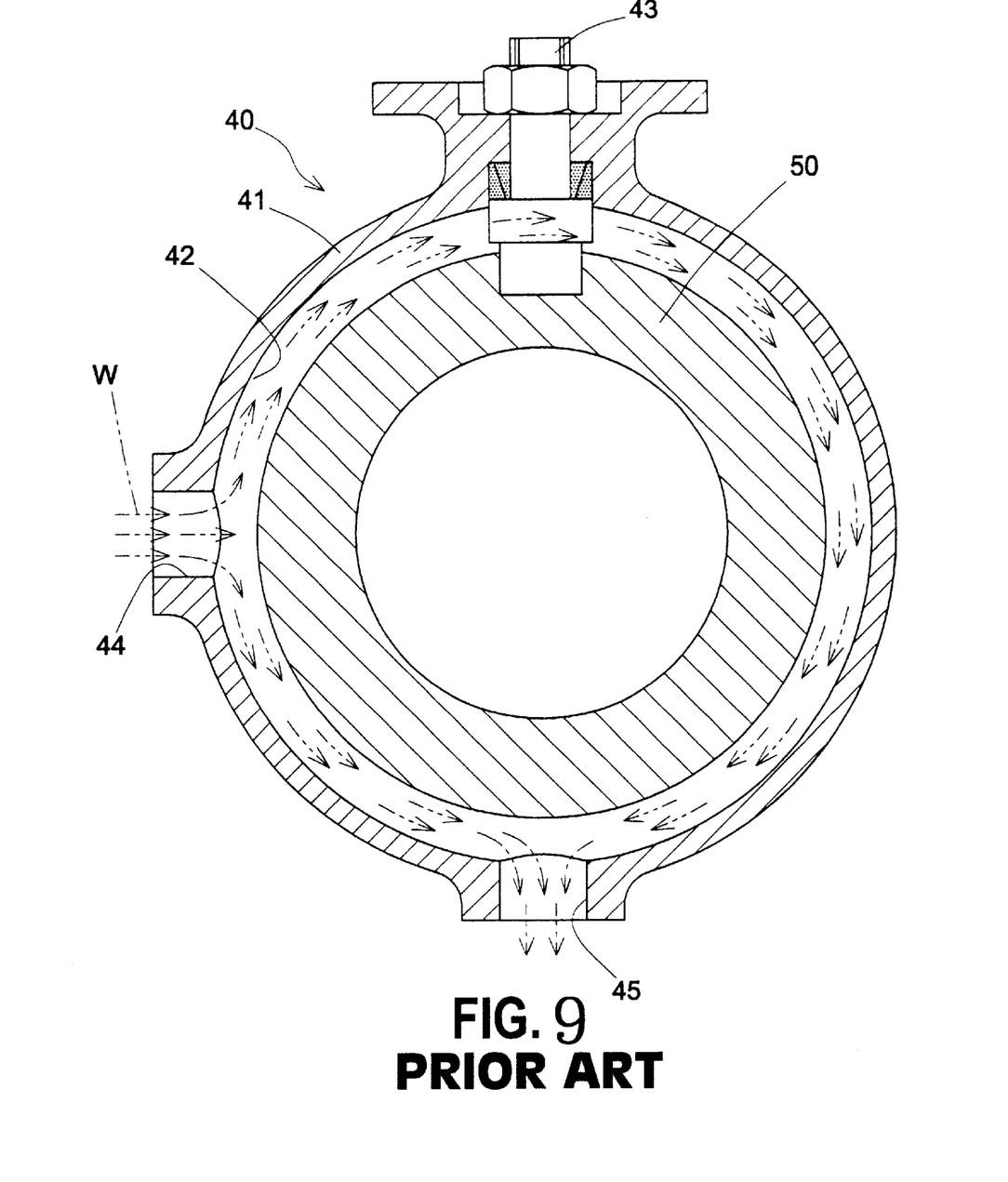
FIG. 9 is a cross-sectional assembly view of a conventional valve in accordance with the prior art.

A conventional valve 40 in accordance with the prior art shown in FIG. 9 comprises a housing 41 defining a hollow receiving chamber 42 which contains a ball 50 which is pivoted with a rotation shaft 43 on the top edge of the housing 41. The housing 41 of the valve 40 is formed with a washing hole 44 which is located at a position opposite to the center of the ball 50, and is communicated with the receiving chamber 42. The housing 41 of the valve 40 is formed with a drain hole 45 which is opposite to the rotation shaft 43, and is communicated with the receiving chamber 42.

A beam of washing liquid "W" may be strongly injected into the valve 40 through the washing hole 44 to wash the inside of the valve 40 and the surface of the ball 50, and may then be drained outward through the drain hole 45. Then, strongly driven dry air may be injected into the valve 40 through the washing hole 44 to dry the inside of the valve 40, and may then be drained outward through the drain hole 45, thereby completing the washing work.

However, the conventional valve has the following disadvantages.

1. The strongly injected washing liquid "W" is directly interrupted by the ball 50, thereby greatly decreasing the washing effect of the washing liquid "W".

2. The washing hole 44 directly faces the center position of the ball 50, so that strongly injected washing liquid "W" will directly touch the surface of the ball 50, thereby easily scraping or wearing the ball 50.

SUMMARY OF THE INVENTION

The present invention has arisen to mitigate and/or obviate the disadvantage of the conventional valve.

The primary objective of the present invention is to provide a valve having an inner washing structure, wherein the valve can be washed through the washing hole directly, without having to detach the valve, thereby greatly facilitating the washing work without wearing the inside of the valve.

In accordance with one aspect of the present invention, there is provided a valve having an inner washing structure, the valve having an inside containing a receiving chamber in which a ball is pivoted, so that the ball forms rotation of a single freedom, wherein:

the valve is formed with at least one washing hole which is located at a position in a tangential plane of an outer diameter of the ball, and is communicated with the receiving chamber, the valve has a bottom formed with a drain hole which is located at a position normal to the tangential plane of the outer diameter of the ball and is communicated with the receiving chamber, and each of the washing hole and the drain hole is sealed by a seal.

In accordance with another aspect of the present invention, there is provided a valve having an inner washing structure, the valve having an inside containing a receiving chamber in which a ball is pivoted, so that the ball forms rotation of a single freedom, wherein:

the valve is formed with a first washing hole which is located at a position in a tangential plane of an outer diameter of the ball, and is communicated with the receiving chamber, and the valve is formed with a second washing hole which is located at a position in the tangential plane of the outer diameter of the ball, and is communicated with the receiving chamber, the second washing hole is located opposite to the first washing hole, and each of the first washing hole and the second washing hole is sealed by a seal.

The valve is formed with a third washing hole which is located beside the first washing hole and is communicated with the receiving chamber, and the valve is formed with a fourth washing hole which is opposite to the third washing hole, and is communicated with the receiving chamber.

The valve is formed with a drain hole opposite to the rotation shaft, the drain hole is located at a position normal to the tangential plane of the outer diameter of the ball and is communicated with the receiving chamber.

Further benefits and advantages of the present invention will become apparent after a careful reading of the detailed description with appropriate reference to the accompanying drawings.

DETAILED DESCRIPTION OF THE INVENTION

Figure 1:
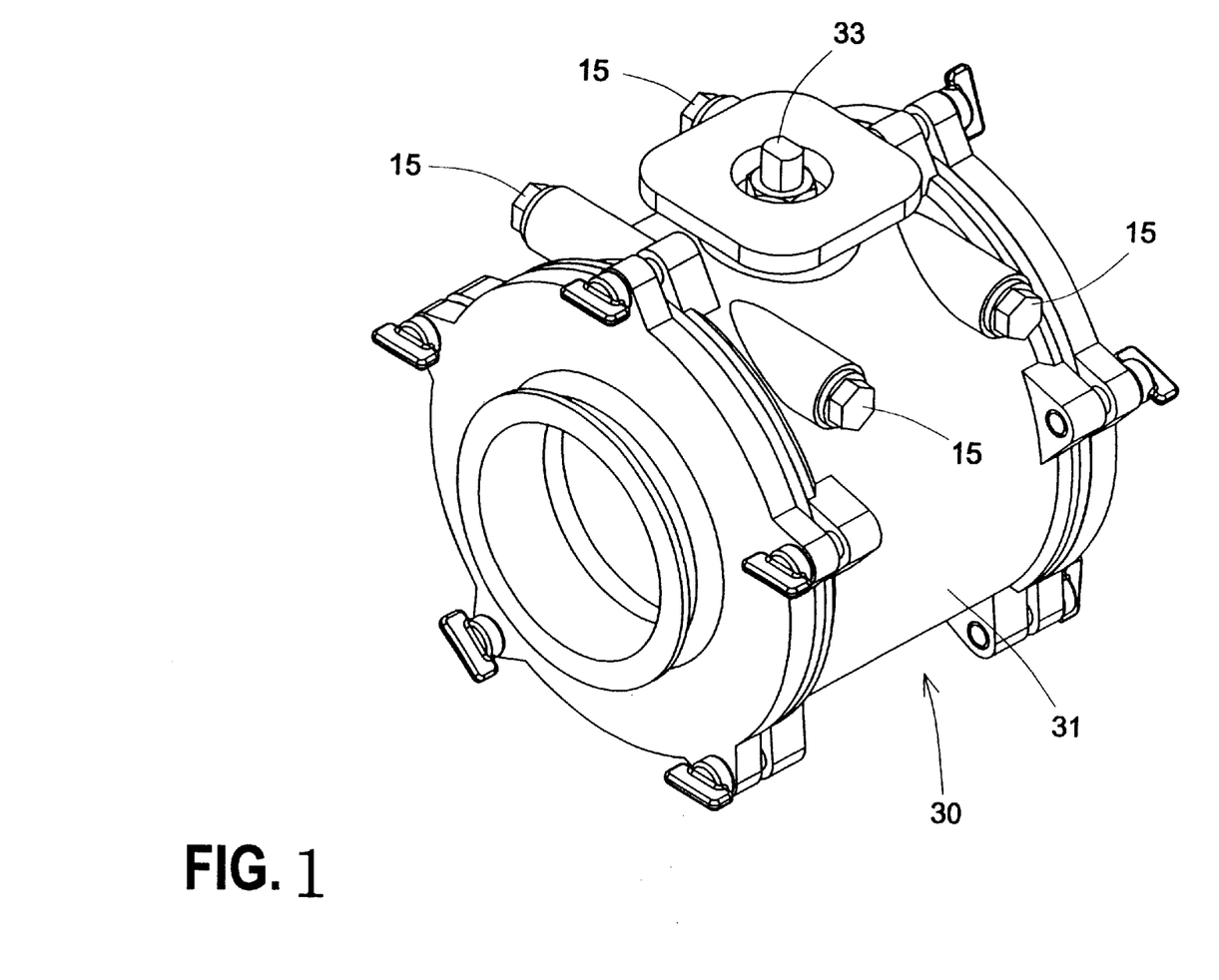
FIG. 1 is an exploded perspective view of a valve having an inner washing structure in accordance with a first state of the present invention.
Figure 2:
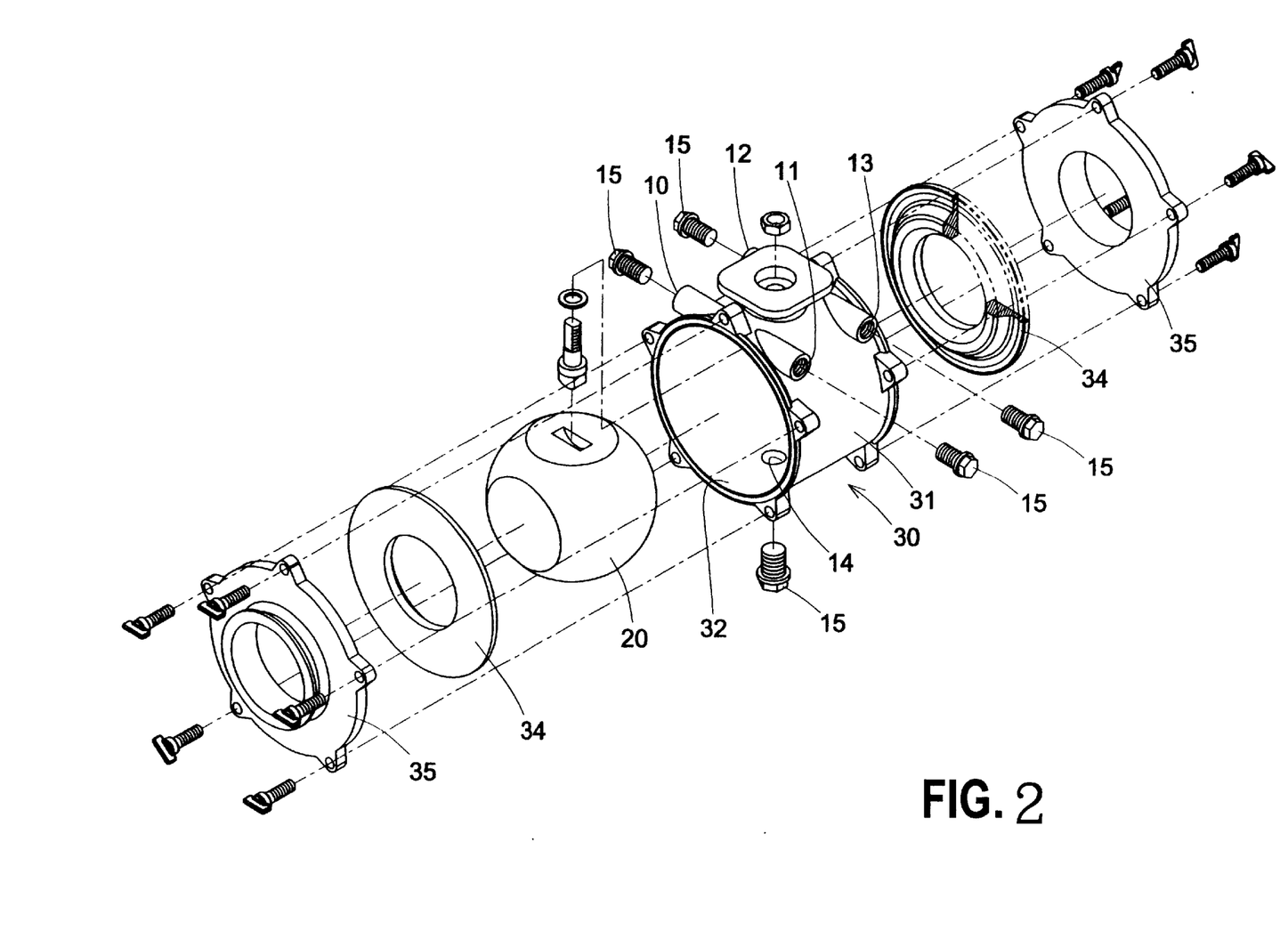
FIG. 2 is an exploded perspective view of the valve having an inner washing structure as shown in FIG. 1.
Figure 3:
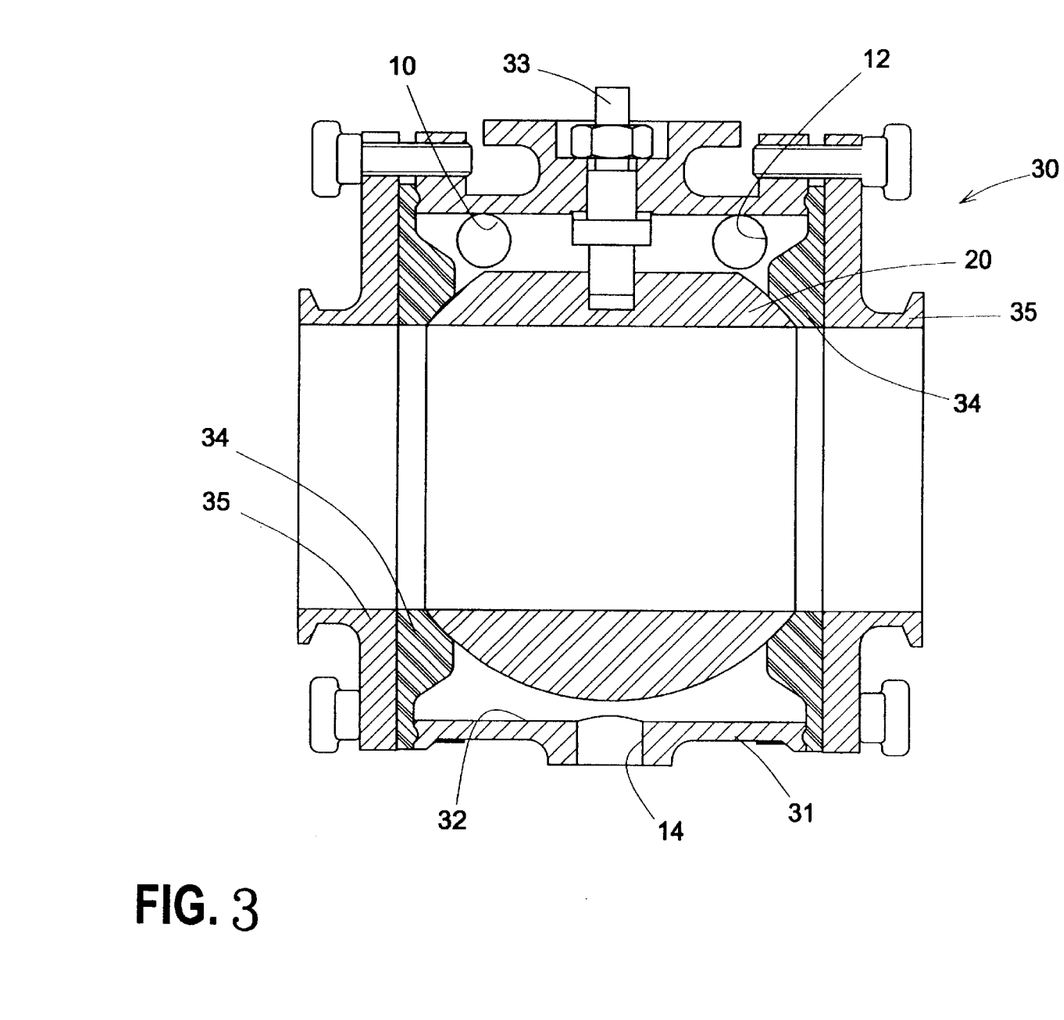
FIG. 3 is a cross-sectional view of the valve having an inner washing structure as shown in FIG. 1.

Referring to the drawings and initially to FIGS. 1–3, a valve 30 having an inner washing structure in accordance with the preferred embodiment of the present invention comprises a housing 31 defining a hollow receiving chamber 32 which contains a ball 20 which is pivoted with a rotation shaft 33 on the top edge of the housing 31. Two ball washers 34 are mounted on the sides of the hollow receiving chamber 32 of the housing 30 respectively, and two side covers 35 are mounted on the two ball washers 34 respectively. The two side covers 35 are screwed on the housing 30 so as to position the two ball washers 34, so that the ball 20 may form a clamp positioning state of rotation of a single freedom by the two ball washers 34.

The housing 31 of the valve 30 is formed with a first washing hole 10 which is located at a position in the tangential plane of the outer diameter of the ball 20, and is communicated with the receiving chamber 32. The housing 31 of the valve 30 is formed with a second washing hole 11 which is opposite to the first washing hole 10 and is communicated with the receiving chamber 32. The housing 31 of the valve 30 is formed with a third washing hole 12 which is located beside the first washing hole 10, and is communicated with the receiving chamber 32. The housing 31 of the valve 30 is formed with a fourth washing hole 13 which is opposite to the third washing hole 12, and is communicated with the receiving chamber 32. The housing 31 of the valve 30 is formed with a drain hole 14 which is opposite to the rotation shaft 33. The drain hole 14 is located at a position normal to the tangential plane of the outer diameter of the ball 20, and is communicated with the receiving chamber 32. Each of the first washing hole 10, the second washing hole 11, the third washing hole 12, the fourth washing hole 13, and the drain hole 14 is sealed by a seal 15.

Figure 4:
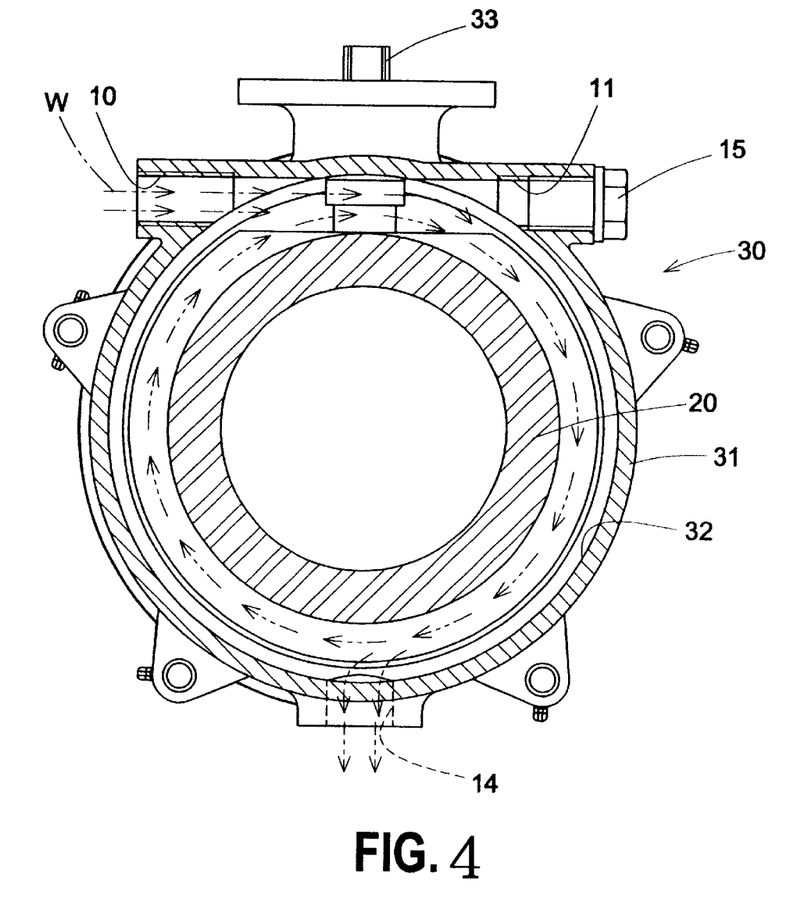
FIG. 4 is a schematic operational view of the valve having an inner washing structure as shown in FIG. 3 in use.

Referring to FIGS. 1–4, when the valve 30 is normally used, the rotation shaft 33 is directed upward. When the user wishes to wash and clean the receiving chamber 32 and the ball 20 of the ball 30, the seals 15 on the first washing hole 10 and the drain hole 14 may be removed as shown in FIG. 4. A strong beam of hot water or cleaning liquid may be strongly injected into the valve 30 through the first washing hole 10. The washing liquid "W" may move along the gap between the receiving chamber 32 and the ball 20 as indicated by arrows in FIG. 4 to perform the washing work, and may be drained outward through the drain hole 14. Then, dry air may be injected into the valve 30 through the first washing hole 10 to dry the inside of the valve 30, thereby completing the washing work. The seals 15 may then be screwed on the first washing hole 10 and the drain hole 14 to seal the first washing hole 10 and the drain hole 14.

Referring to FIGS. 5–8, the rotation shaft 33 may be arranged in a horizontal manner. The washing and cleaning work of the inside of the valve 30 may be accomplished by designs of the first washing hole 10, the second washing hole 11, the third washing hole 12, and the fourth washing hole 13.

Figure 5:
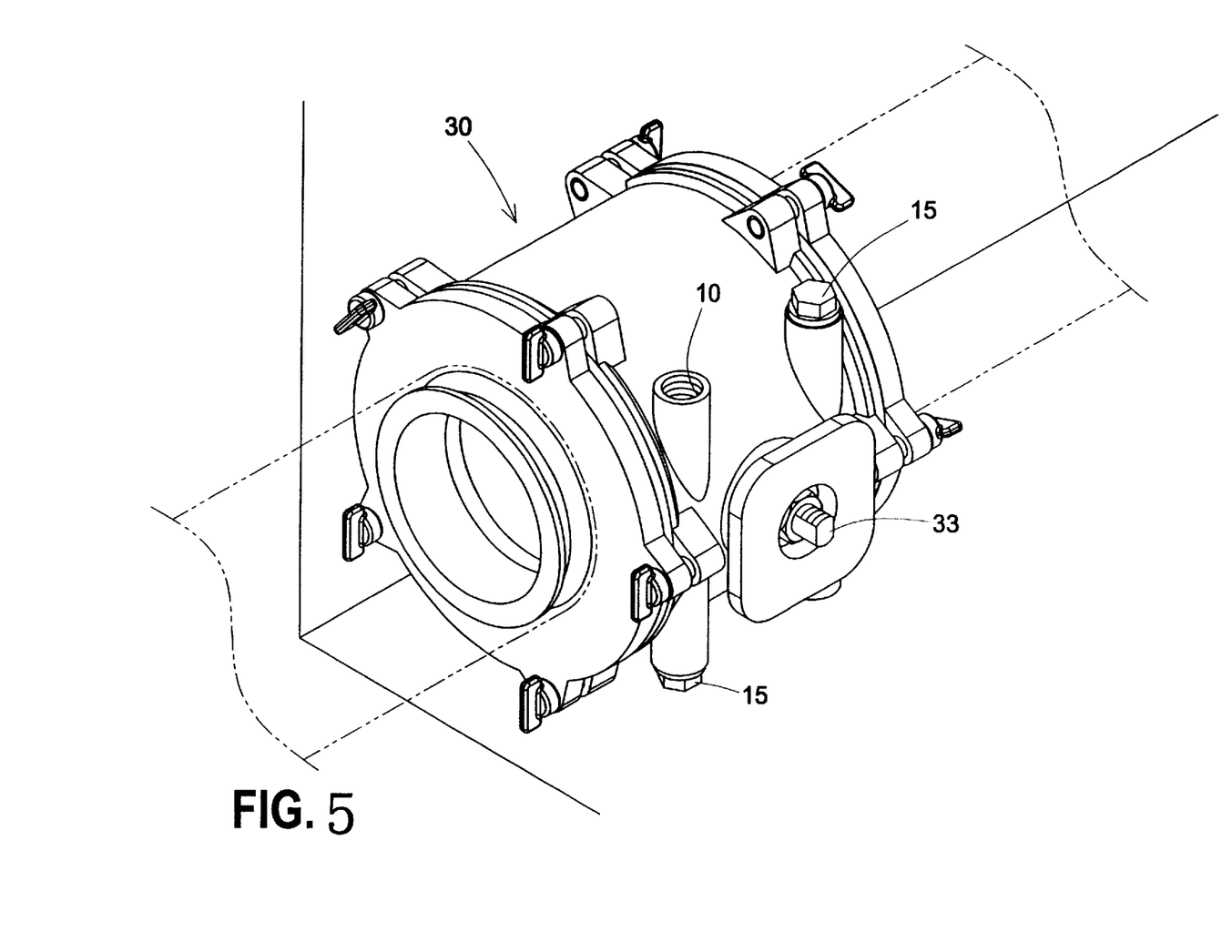
FIG. 5 is an exploded perspective view of a valve having an inner washing structure in accordance with a second state of the present invention.
Figure 6:
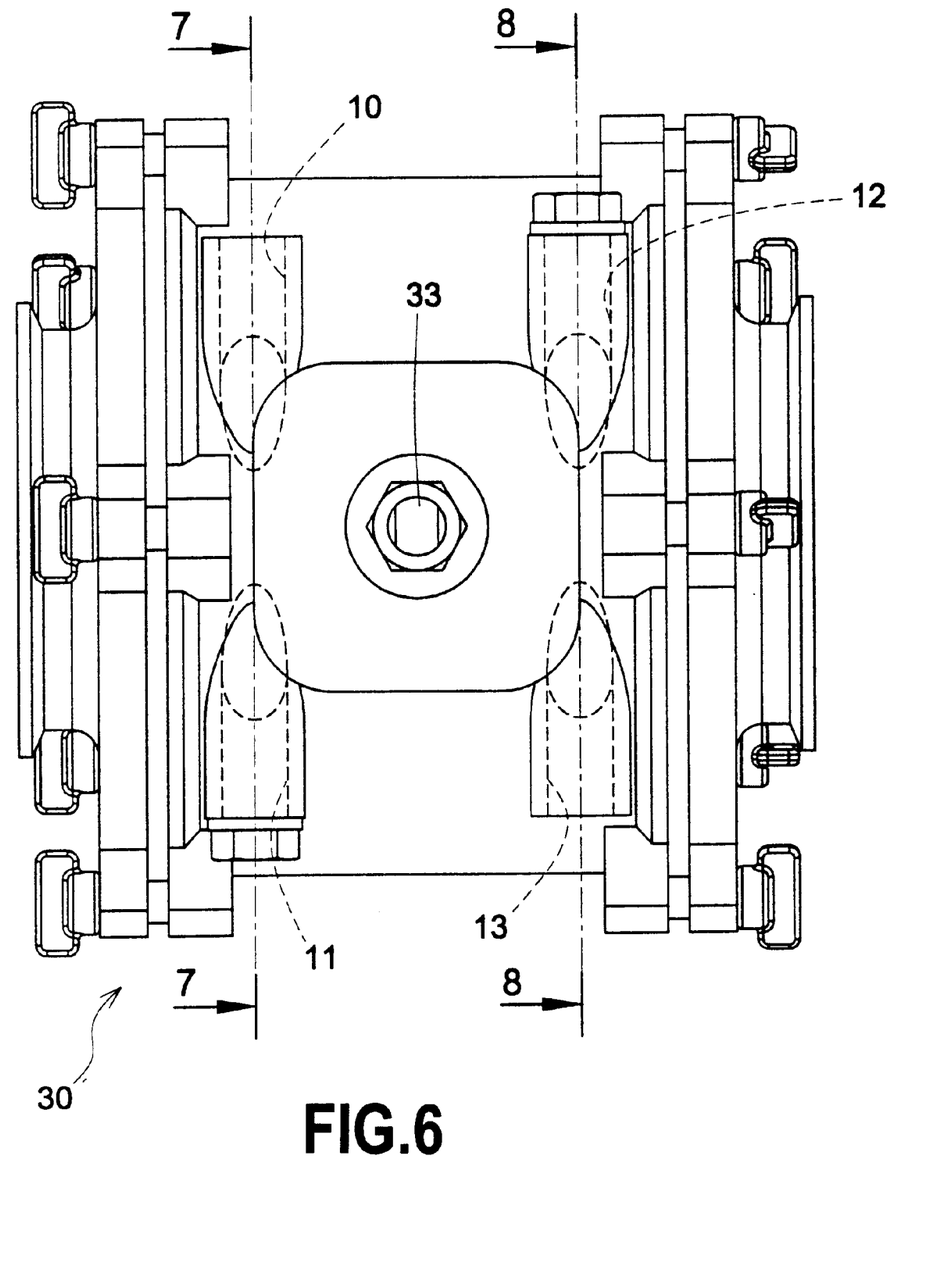
FIG. 6 is a front plan view of the valve having an inner washing structure as shown in FIG. 5.
Figure 7:
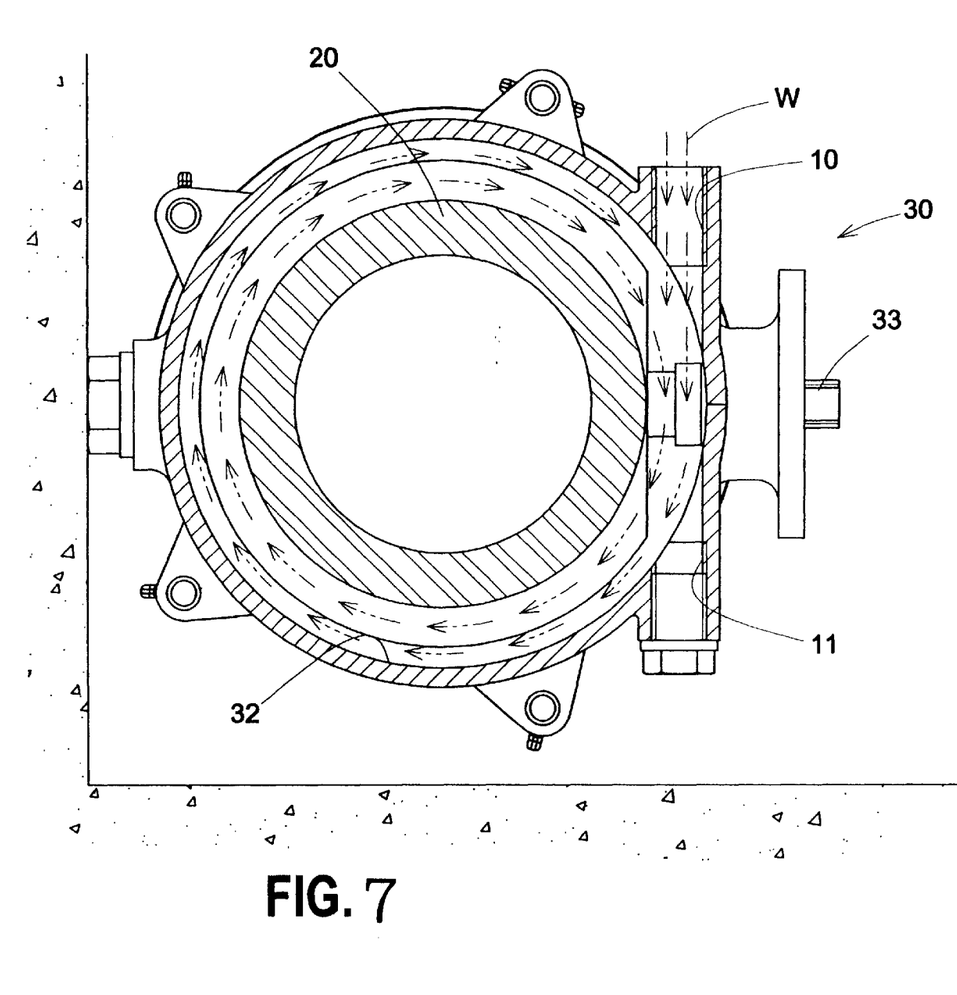
FIG. 7 is a cross-sectional view of the valve having an inner washing structure taken along line 7—7 as shown in FIG. 6.
Figure 8:
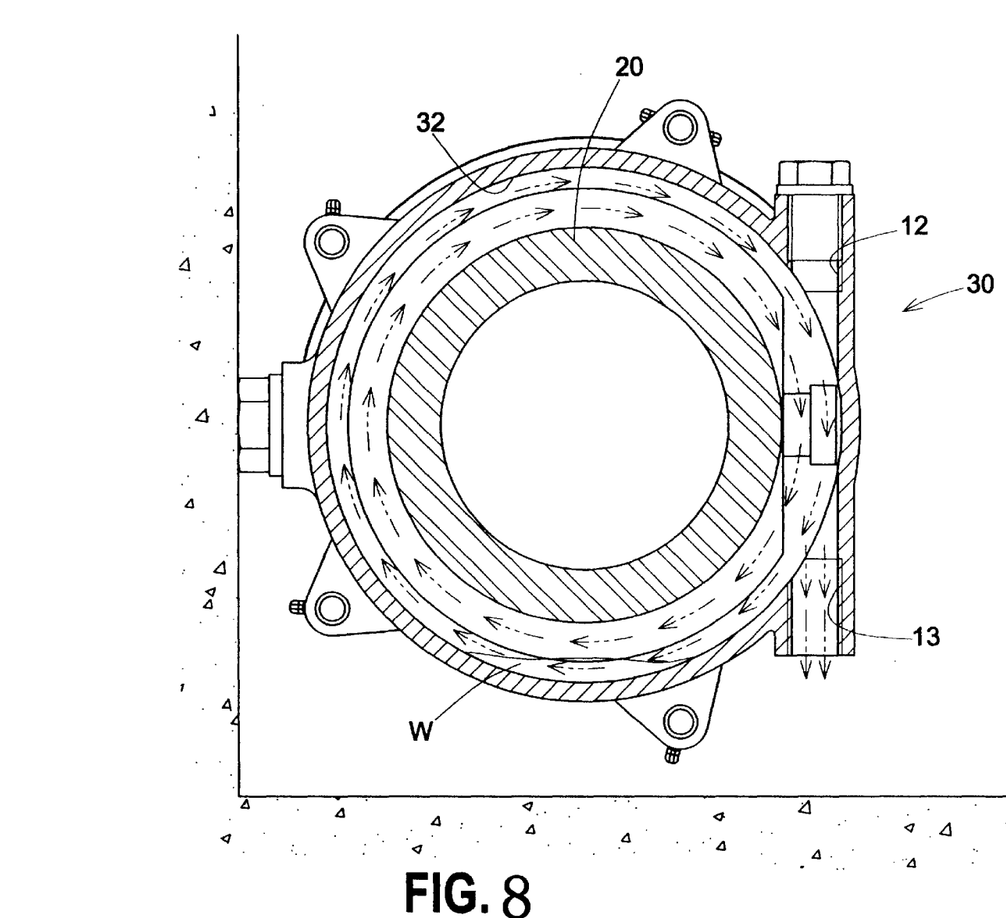
FIG. 8 is a cross-sectional view of the valve having an inner washing structure taken along line 8—8 as shown in FIG. 6.

In practice, the seals 15 on the first washing hole 10 and the fourth washing hole 13 may be removed as shown in FIGS. 5 and 6. A strong beam of hot water or cleaning liquid may be strongly injected into the valve 30 through the first washing hole 10. The washing liquid "W" may move along the gap between the receiving chamber 32 and the ball 20 to perform the washing and cleaning work, and may be drained outward through the fourth washing hole 13. Then, dry air of a high pressure may be injected into the valve 30 through the first washing hole 10 to dry the inside of the valve 30, and the residual washing liquid "W" left in the receiving chamber 32 may be drained outward through the fourth washing hole 13 by the strongly driven dry air, thereby completing the washing work. The seals 15 may then be screwed on the first washing hole 10 and the fourth washing hole 13 to seal the first washing hole 10 and the fourth washing hole 13.

Accordingly, the washing and cleaning work of the inside of the valve 30 may be accomplished by designs of the first washing hole 10, the second washing hole 11, the third washing hole 12, the fourth washing hole 13, and the drain hole 14, without having to detach the valve 30. In addition, the first washing hole 10, the second washing hole 11, the third washing hole 12, and the fourth washing hole 13 are tangential to the ball 20, thereby facilitating injecting the washing liquid "W" at a high pressure into the valve 30 without any interruption, and thereby preventing wearing the surface of the ball 20.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A valve having an inner washing structure, the valve having an inside containing a receiving chamber in which a ball is pivoted, so that the ball forms rotation of a single freedom, wherein:

the valve is formed with a first washing hole which is located at a position in a tangential plane of an outer diameter of the ball, and is communicated with the receiving chamber, and the valve is formed with a second washing hole which is located at a position in the tangential plane of the outer diameter of the ball, and is communicated with the receiving chamber, the second washing hole is located opposite to and in line with the first washing hole, and each of the first washing hole and the second washing hole is sealed by a seal.

2. The valve having an inner washing structure in accordance with claim 1, wherein the valve is formed with a third washing hole which is located beside the first washing hole and is communicated with the receiving chamber, and the valve is formed with a fourth washing hole which is opposite to and in line with the third washing hole, and is communicated with the receiving chamber.

3. The valve having an inner washing structure in accordance with claim 1, wherein the valve is formed with a drain hole opposite to the rotation shaft, the drain hole is located at a position normal to the tangential plane of the outer diameter of the ball and is communicated with the receiving chamber, the drain hole is located vertical to the first washing hole.

* * * * *